US009819906B2

(12) United States Patent  
Lian et al.

(10) Patent No.: US 9,819,906 B2  
(45) Date of Patent: Nov. 14, 2017

(54) SELECTIVE DATA CONTENT SHARING

(71) Applicant: Cisco Technology, Inc., San Jose, CA (US)

(72) Inventors: TiongHu Lian, Cupertino, CA (US); Senthil Kumar Kanniappan, San Jose, CA (US); Aravind Srinivasa Raghavan, Santa Clara, CA (US); James R. Watson, II, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 703 days.

(21) Appl. No.: 14/202,175

(22) Filed: Mar. 10, 2014

(65) Prior Publication Data

US 2015/0256567 A1  Sep. 10, 2015

(51) Int. Cl.
| | |
|---|---|
| *G06F 15/16* | (2006.01) |
| *H04N 7/15* | (2006.01) |
| *H04L 29/06* | (2006.01) |
| *H04L 12/18* | (2006.01) |
| *H04M 3/56* | (2006.01) |
| *H04M 7/00* | (2006.01) |

(52) U.S. Cl.
CPC .......... *H04N 7/15* (2013.01); *H04L 12/1822* (2013.01); *H04L 65/4038* (2013.01); *H04L 65/605* (2013.01); *H04M 3/567* (2013.01); *H04M 7/0027* (2013.01)

(58) Field of Classification Search
CPC . H04L 67/06; H04L 12/1822; H04L 12/1827; H04L 65/403; H04N 7/15; H04M 3/56; H04M 3/567; H04M 7/0027  
See application file for complete search history.

(56) References Cited

U.S. PATENT DOCUMENTS

| | | | | |
|---|---|---|---|---|
| 5,857,189 | A | * | 1/1999 | Riddle .................. G06Q 10/10 707/999.01 |
| 6,959,322 | B2 | * | 10/2005 | Ludwig ................. G06Q 10/10 709/204 |
| 8,264,519 | B2 | | 9/2012 | Lunde et al. |
| 8,300,078 | B2 | | 10/2012 | Lovhaugen et al. |
| 8,471,888 | B2 | | 6/2013 | George et al. |

(Continued)

*Primary Examiner* — Liangche A Wang  
*Assistant Examiner* — Ayele Woldemariam  
(74) *Attorney, Agent, or Firm* — Edell, Shapiro & Finnan, LLC

(57) ABSTRACT

Presented herein are selective data content sharing techniques that enable multiple data content windows displayed at a computing device to be separately displayed within a teleconferencing system. In one example, a content analyzer server of a teleconferencing system receives a request from a computing device connected to a local teleconference endpoint to initiate selective data content sharing. The content analyzer server is configured to identify a plurality of data content windows displayed at the computing device for selective sharing at separate displays of the local teleconference endpoint and at separate displays of one or more remote teleconferencing endpoints. The content analyzer server is further configured to split a data content stream originating at the computing device into a plurality of separate data content streams, wherein each data content window identified for selective sharing has an associated separate data content stream.

20 Claims, 6 Drawing Sheets

(56) References Cited

U.S. PATENT DOCUMENTS

| | | |
|---|---|---|
| 8,495,193 B2 | 7/2013 | Kuzhiyil et al. |
| 2007/0061398 A1* | 3/2007 | Forssell .............. H04L 12/1827 |
| | | 709/204 |
| 2012/0274728 A1* | 11/2012 | Yasoshima ............... H04N 7/15 |
| | | 348/14.07 |
| 2012/0306993 A1* | 12/2012 | Sellers-Blais ....... H04L 65/1009 |
| | | 348/14.08 |
| 2014/0063177 A1* | 3/2014 | Tian ...................... H04N 7/152 |
| | | 348/14.07 |

* cited by examiner

SELECTIVE DATA CONTENT SHARING

TECHNICAL FIELD

The present disclosure relates to teleconferencing systems.

BACKGROUND

Teleconferencing systems, sometimes referred to as videoconferencing, Telepresence, or collaboration systems, allow meetings between persons or groups of people at different locations. Teleconferencing systems may include equipment configured to provide both video and audio communication between the different locations.

For example, certain teleconferencing systems include endpoints that are equipped with multiple cameras and displays configured to capture and present, respectively, different video streams. The video streams can be classified as participant streams (i.e., video captured by cameras and containing views of meeting participants) or data content streams (i.e., computer generated graphical content presented by meeting participants). The data content streams may be generated by various computing devices such as mobile phones, tablet computers, laptop computers, etc. that are connected to the teleconferencing system.

DESCRIPTION OF EXAMPLE EMBODIMENTS

Overview

Presented herein are selective data content sharing techniques that enable multiple data content windows displayed at a computing device to be separately displayed within a teleconferencing system. In one example, a content analyzer server of a teleconferencing system receives a request from a computing device connected to a local teleconference endpoint to initiate selective data content sharing. The content analyzer server is configured to identify a plurality of data content windows displayed at the computing device for selective sharing at separate displays of the local teleconference endpoint and at separate displays of one or more remote teleconferencing endpoints. The content analyzer server is further configured to split a data content stream originating at the computing device into a plurality of separate data content streams, wherein each data content window identified for selective sharing has an associated separate data content stream.

Example Embodiments

Figure 1:
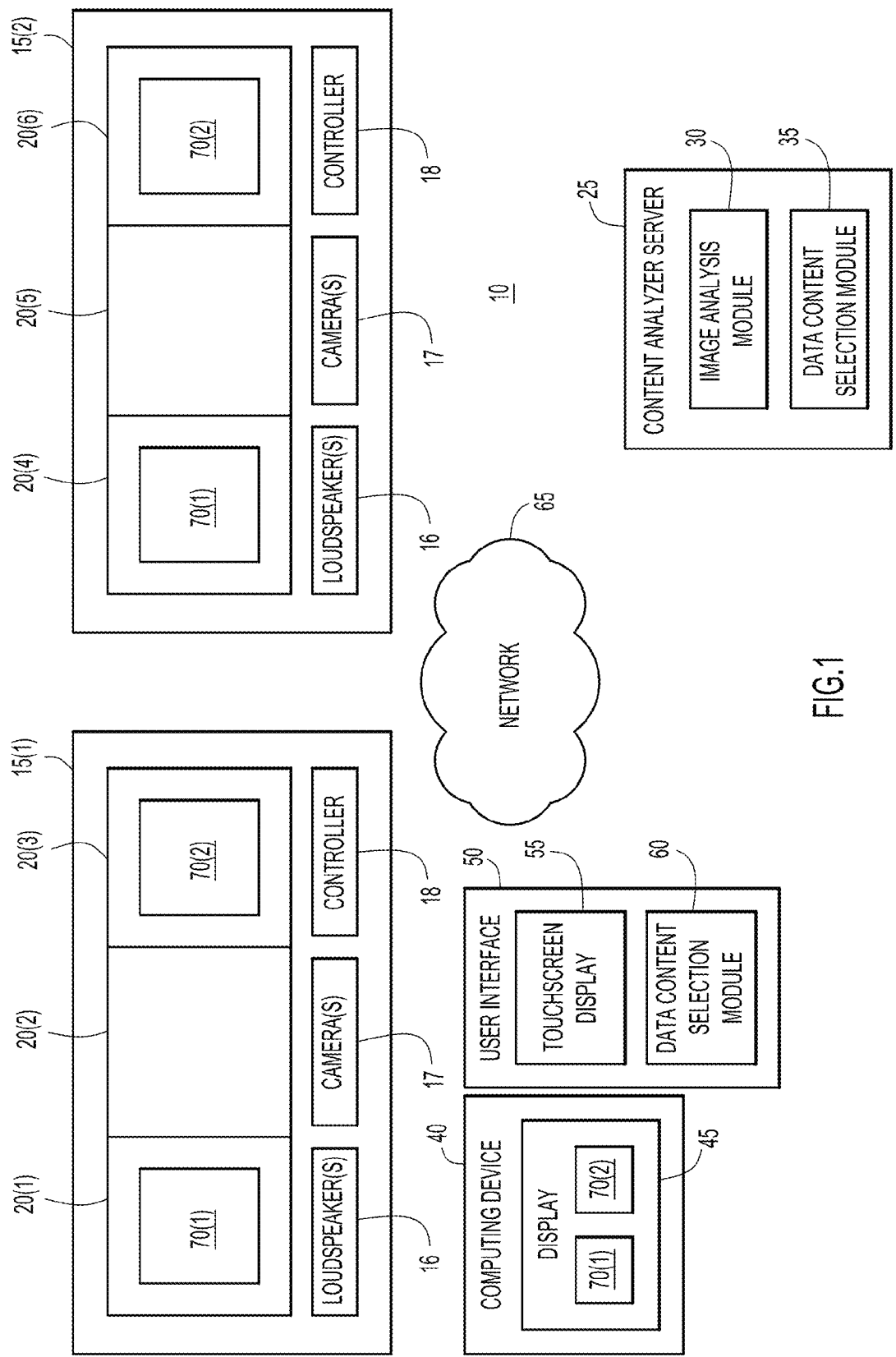
FIG. 1 is a block diagram of a teleconferencing system configured to implement selective sharing of data content in accordance with examples presented herein.

FIG. 1 is a diagram of a teleconferencing system 10 configured to implement selective sharing of data content (e.g., documents, images, etc.) in accordance with examples presented herein. The teleconferencing system 10 comprises a teleconferencing endpoint 15(1) disposed at a first location and a second teleconferencing endpoint 15(2) disposed at a second location. The first and second teleconferencing endpoints 15(1) and 15(2) each include a plurality of displays 20. In the example arrangement of FIG. 1, teleconferencing endpoint 15(1) comprises three displays 20(1), 20(2), and 20(3), while teleconferencing endpoint 15(2) comprises three displays 20(4), 20(5), and 20(6). Each of the teleconferencing endpoints 15(1) and 15(2) may also comprise loudspeaker(s) 16, camera(s) 17, and a control module or controller 18. It is to be appreciated that other combinations of displays and hardware elements are possible in alternative examples.

FIG. 1 illustrates an arrangement that includes integrated teleconferencing endpoints 15(1) and 15(2). Integrated teleconferencing endpoints are endpoints where the displays are integrated with the other endpoint components (e.g., controller, cameras, etc.). It is to be appreciated that the use of integrated teleconferencing endpoints is merely one example and that the selective teleconference data content sharing techniques may be used with other endpoint arrangements. For example, the selective teleconference data content sharing techniques may be used in arrangements that include distributed teleconferencing endpoints. Distributed teleconferencing endpoints are endpoints where the various endpoint components (e.g., displays, cameras, etc.) are separate devices that are interconnected by, for example, cables.

Returning to the example of FIG. 1, the teleconferencing system 10 further comprises a content analyzer server 25. The content analyzer server 25 is the control entity for the teleconferencing system 10 and comprises an image analysis module 30 and a data content selection module 35. Further details of the operation of the image analysis module 30 and the data content selection module 35 are provided below.

Co-located with (e.g., in the same physical meeting room as) the first teleconferencing endpoint 15(1) are a computing device 40 and a user interface device 50. As described further below, the computing device 40 includes a display 45 and is configured to generate data content for sharing at the teleconferencing endpoints 15(1) and 15(2) during a teleconference call. The user interface device 50 may be a general or special purpose computing device that is configured to control the first teleconferencing endpoint 15(1) during a teleconference call. In certain examples, the user interface device 50 is a tablet computing device with a touchscreen display 55 and a data content selection module 60.

Since the first teleconferencing endpoint 15(1) is co-located with the computing device 40 and is used by a meeting participant to share data content, the first teleconferencing endpoint 15(1) is sometimes referred to herein as a "local" teleconferencing endpoint. Conversely, since the second teleconferencing endpoint 15(2) is not co-located with the computing device 40, the second teleconferencing endpoint 15(2) is sometimes referred to herein as a "remote" teleconferencing endpoint.

The teleconferencing endpoints 15(1) and 15(2) are disposed at different physical locations and are connected by a network 65. The network 65 may be, for example, one or more of a local area network (LAN), a wide area network (WAN), etc. The content analyzer server 25 and potentially the user interface device 50 and/or computing device 40 may also be configured for connection to the network 65. Accordingly, the various devices of FIG. 1 may include network interface(s) for wired or wireless connection to the network

65. For ease of illustration, the network interfaces and connections to network 65 have been omitted from FIG. 1.

In general, the purpose of a teleconference is to enable persons at different locations to collaborate as if they were present within the same physical meeting room. As such, the teleconferencing system 10 may provide both video and audio communication (i.e., video and audio streams) between the teleconferencing endpoints 15(1) and 15(2). The video streams may be either participant streams (i.e., streams captured by cameras and containing views of meeting participants) or data content streams (i.e., graphical content (data content) such as documents, images, videos, etc. presented by meeting participants). In the example of FIG. 1, data content streams may be generated by the computing device 40.

In conventional systems, a data content stream is created by connecting a computing device to a local teleconferencing endpoint. For example, a meeting participant could connect a laptop to the endpoint via a port (e.g., Video Graphics Array (VGA), Digital Visual Interface (DVI), High-Definition Multimedia Interface (HDMI), etc.) and corresponding cable. As a result, the entire display of the laptop is shown at a single display of the local teleconferencing endpoint. That is, one data content stream corresponding to the display of the laptop is displayed at a corresponding single display of the local teleconferencing endpoint so that the meeting participant can share the laptop display or specific applications. The local teleconferencing endpoint display corresponding to the laptop display is transmitted to and displayed at a corresponding display of the remote teleconferencing endpoint(s) participating in the teleconference call. In other words, the laptop display is replicated at a display of the local teleconferencing endpoint and at a display of each of the remote teleconferencing endpoints.

When a meeting participant shares multiple separate pieces of data content, the meeting participant has two options. First, the meeting participant could open each of the pieces of data content on different computing devices and separately connect each of those computing devices to the local teleconferencing endpoint. In this way, each computing device has a corresponding display at the local and remote teleconferencing endpoints. However, this method is cumbersome since the meeting participant needs to manage multiple computing devices. This also requires a teleconferencing system that provides multiple cables and ports for connection of multiple computing devices to a local endpoint. Multiple ports are not available on all teleconferencing endpoints.

The second conventional option for a meeting participant to share multiple pieces of data content is to open all of the pieces of data content on a single computing device so that they all appear on the associated (single) local and remote teleconferencing endpoint display. However, the display of multiple pieces of data content on the same display may make the data content crowded and/or unreadable, thereby detracting from the user experience. As such, the above conventional techniques are acceptable when a meeting participant only shares a single piece of data content (e.g., one document, image, video, etc.), but are disadvantageous when a meeting participant shares multiple pieces of data content.

Presented herein are selective data content sharing techniques that enable a meeting participant to share multiple pieces of data content from a single computing device such that the data content can be selectively displayed on separate displays of both local and/or remote teleconferencing endpoints. For example, FIG. 1 illustrates an example where first and second pieces of data content are displayed at the display 45 of computing device 40. When the pieces of data content are open, each piece of data content forms a window, referred to herein as a data content window, on the display 45. For example, the first piece of data content is displayed as data content window 70(1) and the second piece of data content is displayed as data content window 70(2). In general, a data content window may correspond to, for example, a document, presentation, image, video, etc. that is open on the display 45.

As shown, the teleconferencing system 10 is configured such that through a single video (e.g., VGA, DVI, HDMI, etc.) connection of the computing device 40 to the teleconference endpoint 15(1), the two data content windows 70(1) and 70(2) can be displayed at different displays of the first and second teleconferencing endpoints 15(1) and 15(2).

Figure 2:
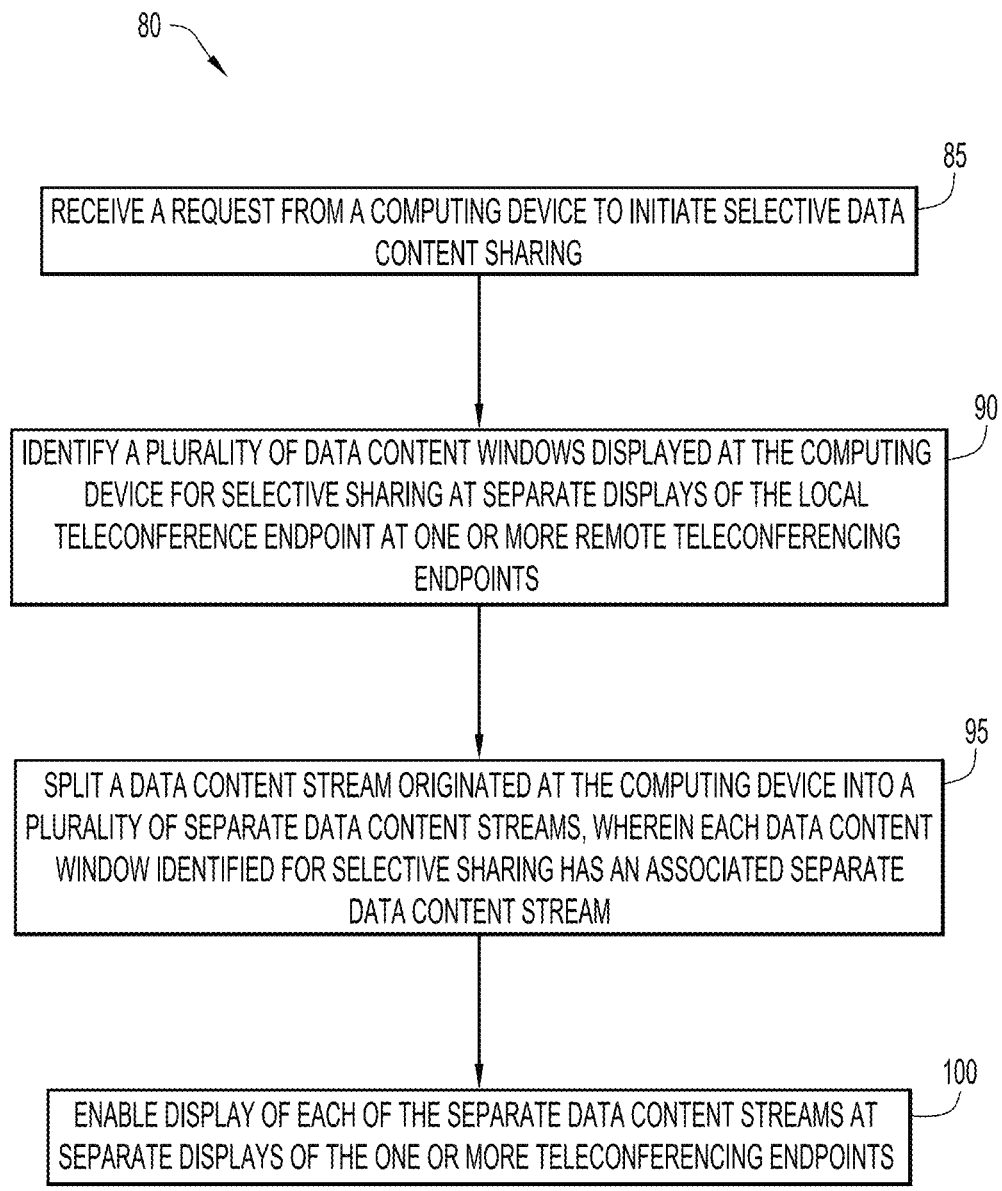
FIG. 2 is a flowchart of example selective data content sharing techniques presented herein.
Figure 3:
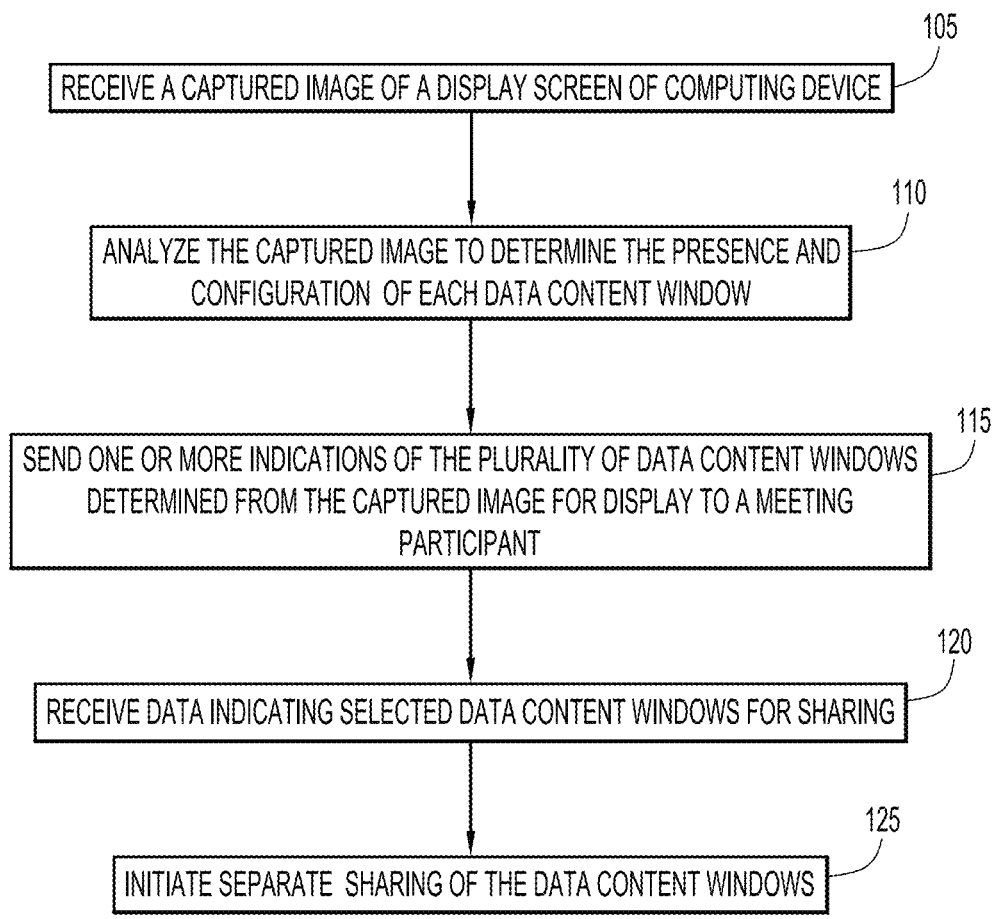
FIG. 3 is a flowchart illustrating one method for identifying data content windows for selective sharing.
Figure 5:
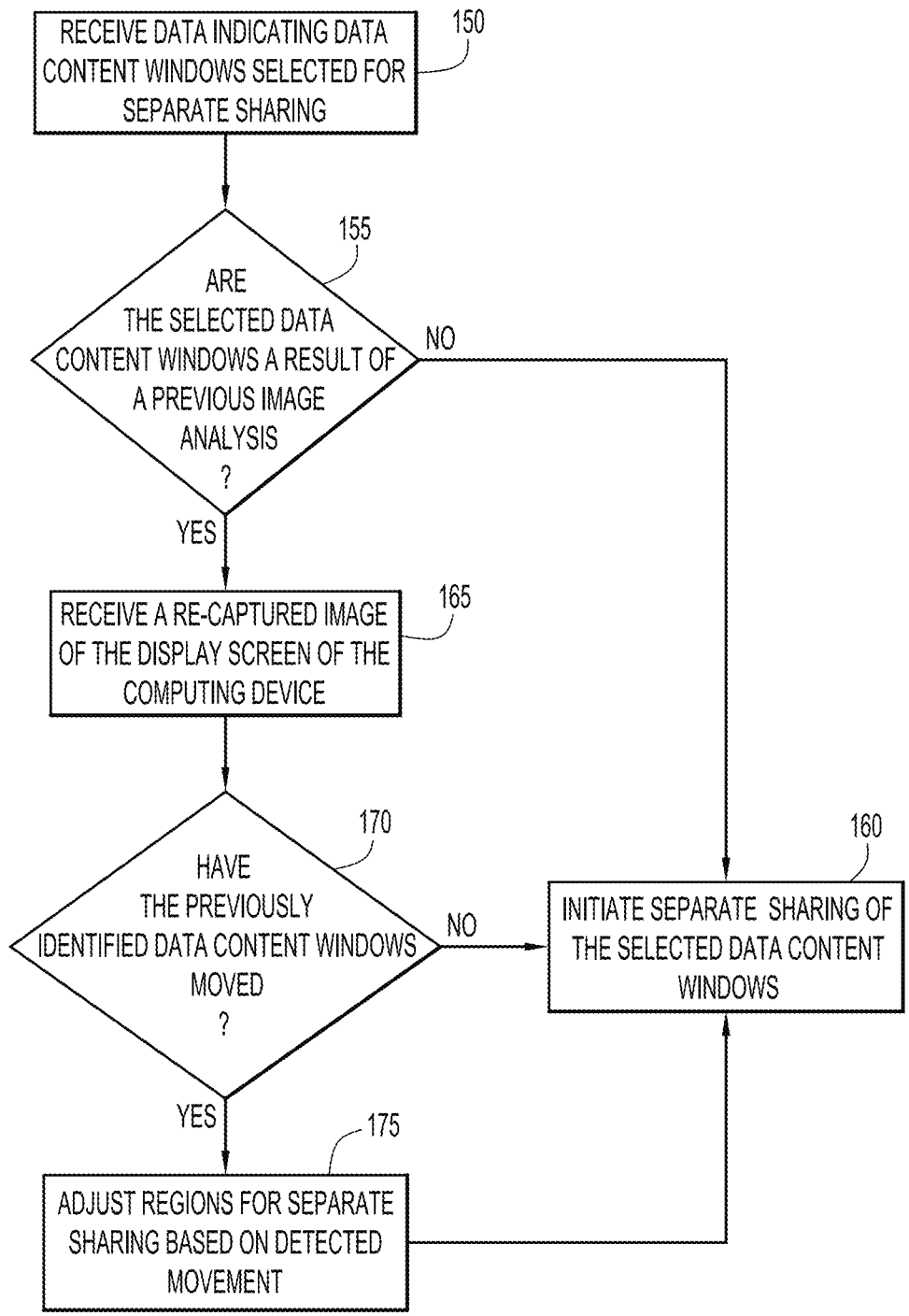
FIG. 5 is a flowchart illustrating another method for identifying data content windows for selective sharing.

FIGS. 2, 3, and 5 are flowcharts illustrating further details of selective teleconference data content sharing techniques in accordance with examples presented herein. For ease of illustration, the examples of FIGS. 2, 3, and 5 are described with reference to the elements of FIG. 1.

Referring first to FIG. 2, an example selective data content sharing method 80 begins at 85 where the content analyzer server 25 receives a request from the computing device 40 to initiate selective data content sharing at the computing device. In accordance with certain examples presented herein, the computing device 40 does not have a direct connection with the content analyzer server 25, but rather only with the endpoint 15(1) as shown by the dashed line in FIG. 1. As such, all communications between the computing device 40 and the server 25 occur through the teleconferencing endpoint 15(1).

Prior to transmitting the request, the computing device 40 may be configured for selective data content sharing by, for example, opening data content windows on the display 45 and connecting the computing device 40 to teleconferencing endpoint 15(1). As noted, a plurality of data content windows (i.e., windows 70(1) and 70(2)) are opened at display 45 of computing device 40. The computing device 40 may also be configured for content sharing by adjusting the resolution of the display 45 to a maximum level.

At 90, the image analysis module 30 of content analyzer server 25 identifies a plurality of data content windows displayed at the computing device 40 for selective sharing at separate displays of the local teleconferencing endpoint 15(1) and the remote teleconferencing endpoint 15(2). Further details regarding the identification of the plurality of data content windows for sharing are provided below with reference to FIGS. 3 and 5.

At 95, the data content selection module 35 of the content analyzer server 25 splits a data content stream originating at computing device 40 into a plurality of separate (individual) data content streams based on the data content windows identified for selective sharing. More specifically, each data content window identified for selective sharing has an associated separate data content stream. At 100, the display of each of the individual data content streams at the separate displays of the one or more teleconferencing endpoints is enabled and started.

FIG. 3 is a flowchart illustrating one method for identifying a plurality of data content windows for sharing at separate displays of one or more teleconferencing endpoints (i.e., one example of the operations performed at 90 of FIG. 2). The operations of FIG. 3 begin at 105 where the image analysis module 30 of content analyzer server 25 receives a captured image of the display 45 of the computing device

40. The image of display 45 may be automatically captured at the computing device 40 or may be captured in response to a command issued by the image analysis module 30 of the content analyzer server 25.

At 110, the image analysis module 30 analyzes the captured image to determine the presence and configuration (e.g., location, size, shape, type, etc.) of each data content window. A number of different techniques may be executed by the image analysis module 30 to determine the presence and configuration of each of the data content windows. For example, in certain examples the image analysis module 30 may use appearance-based methods to detect the presence and configuration of the data content windows. Appearance-based methods may include, for example, edge matching, Divide-and-Conquer searching, Greyscale matching, Gradient matching, use of Histograms of receptive field responses, etc. In other examples, the image analysis module 30 may use feature-based methods to detect the presence and configuration of the data content windows. Feature-based methods may include, for example, the use of: interpretation trees, hypothesize and testing, Pose consistency, Pose clustering, Invariance, Geometric hashing, a Scale-invariant feature transform (SIFT), Speeded Up Robust Features (SURF), etc. In certain examples, the image analysis module 30 may use three-dimensional (3D) cues, genetic algorithms, biologically inspired object recognition, Artificial neural networks and Deep Learning, explicit and implicit 3D object models, Fast indexing, Gradient histograms, Shading, Template matching, Window-based detection, the Open Source Computer Vision Library, Boundary and Object Detection, etc. to determine the presence and configuration of each of the data content windows As noted above, two pieces of data content are opened at display 45 of computing device 40. Therefore, as a result of the analysis at 110, the presence and configuration of two data content windows 70(1) and 70(2) are determined.

At 115, the data content selection module 35 of content analyzer server 25 sends one or more indications of the determined data content windows 70(1) and 70(2) for display to a meeting participant at the user interface device 50. That is, the data content selection module 60 receives data from the data content selection module 35 enabling the display of data representing the determined data content windows. A meeting participant may then use the displayed representations of the determined data content windows to establish the display of the determined data content windows 70(1) and 70(2).

The displayed representations of the determined data content windows may be used by the meeting participant to select which of the data content windows 70(1) and 70(2) to share and/or to select the display arrangement of the data content windows 70(1) and 70(2) at the local and/or remote endpoint (i.e., the meeting participant may select which endpoint displays should display the data content windows and/or the size, location, orientation, etc. of the data content windows 70(1) and 70(2) when displayed at an endpoint).

In one example, the data received at the user interface device 50 may enable the data content selection module 60 to graphically represent the determined data content windows 70(1) and 70(2) at touchscreen display 55 of the user interface device 50. The meeting participant may then manipulate touch screen display to select which of the displayed determined data content windows 70(1) and 70(2) should be shared. In other examples, data that results in the generation of a list (e.g., text, images, etc.) of the determined data content windows 70(1) and 70(2) at the touchscreen display 55 may be sent to the user interface device 50.

Figure 4:
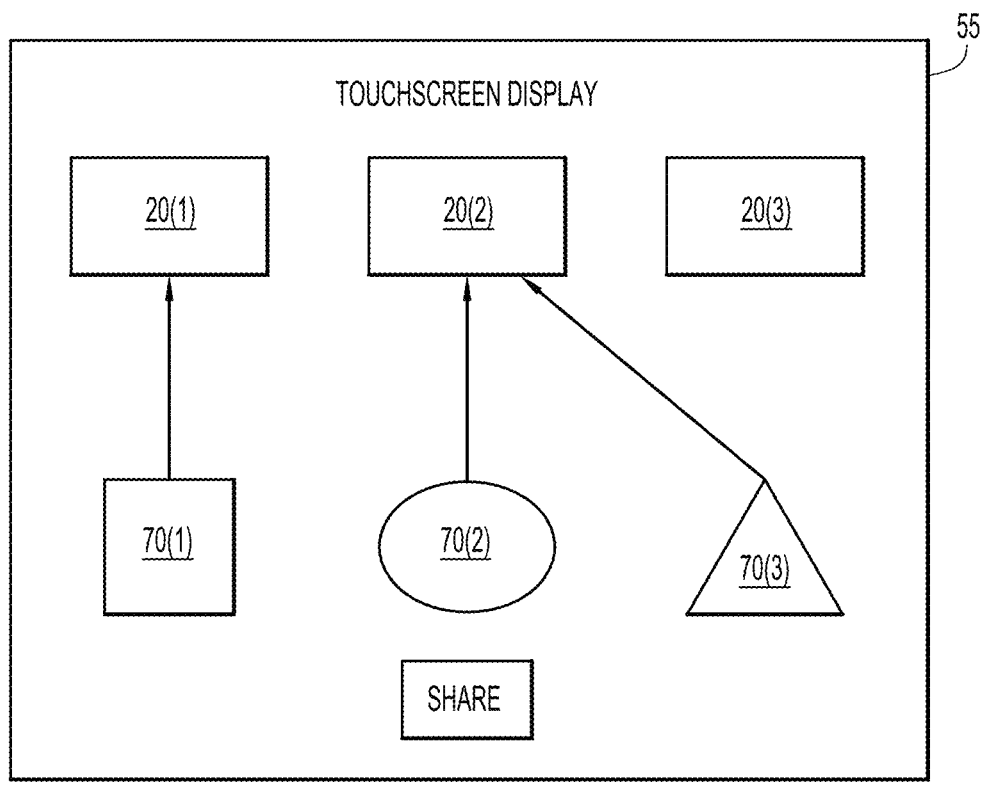
FIG. 4 is a schematic diagram illustrating a touchscreen of a user interface device during selection of data content windows in accordance with examples presented herein.

FIG. 4 is a diagram further illustrating an example of graphical display of data content windows at touchscreen display 55. In the example of FIG. 4, the three displays 20(1), 20(2), and 20(3) are graphically represented at touchscreen display 55. Also graphically represented at touchscreen display 55 are the determined data content windows 70(1) and 70(2). In this specific example, a third data content window 70(3) has also been determined. A meeting participant manipulates touchscreen 55 to select which data content windows 70(1), 70(2), and 70(3) are to be shared by, for example, dragging the data content windows to a graphically represented display 20(1), 20(2), or 20(3).

In FIG. 4, the meeting participant drags data content window 70(1) to display 20(1). As such, data content window 70(1) is determined to be selected for sharing at display 20(1) of local teleconferencing endpoint 15(1) (and a corresponding display of remote teleconferencing endpoint 15(2)). Additionally, the meeting participant drags data content windows 70(2) and 70(3) to display 20(2). As such, data content windows 70(2) and 70(3) are determined to be selected for sharing at display 20(2) of local teleconferencing endpoint 15(1) (and a corresponding display of remote teleconferencing endpoint 15(2)).

Returning to the example of FIG. 3, at 120, the data content selection module 35 of content analyzer server 25 receives one or more indications of the determined data content windows 70(1) and 70(2) that were selected by the meeting participant for sharing, referred to herein as the selected data content windows. At 125, separate sharing of the data content windows is initiated.

As noted above, in certain circumstances, the meeting participant has the option to select which endpoint displays are used to share the selected data content windows and/or the arrangement of the data content windows at the local and/or remote endpoints. As such, one or more indications of the determined data content windows 70(1) and 70(2) selected by the meeting participant may also include information identifying the display arrangement of the selected data content windows.

As noted above with reference to FIG. 2, the one or more indications of the determined data content windows 70(1) and 70(2) (and optionally additional information) may be used by the content analyzer server 25 to split the data content stream originating at computing device 40 into individual data content streams for display at the separate displays of the local and/or remote teleconferencing endpoints.

FIG. 3 illustrates an example arrangement where selection of determined data content windows occurs through the use of data content selection module 60 at a user interface device 50. It is to be appreciated that the presence and use of user interface device 50 is merely one example and the user interface device 50 may be omitted in other arrangements. For example, in alternative arrangements the selection of determined data content windows may occur at the computing device 40 (i.e., the computing device 40 operates as the user interface device). Alternatively, the selection of determined data content windows may occur at the local teleconferencing endpoint (e.g., the local teleconferencing endpoint operates as the user interface device and is controlled through the use of a remote control associated with the local teleconferencing endpoint).

FIG. 5 is a flowchart illustrating another method for identifying a plurality of data content windows for sharing at separate displays of one or more teleconferencing endpoints (i.e., another example of the operations performed at 90 of FIG. 2). The operations of FIG. 5 begin at 150 where the data content selection module 35 of content analyzer server 25 receives data indicating a selection of data content windows for separate sharing. As noted above with reference to FIG. 3, this selection of data content windows may be sent by the user interface device 50 following an image analysis. For example, the content analyzer server 25 may send indications that cause the plurality of determined data content windows to be graphically shown at touchscreen display 55 of the user interface device 50. However, in other examples the selection of the data content windows is based on un-solicited meeting participant (user) inputs received at the computing device 40.

More specifically, in certain examples, when the meeting participant initiates selective data content sharing at the computing device 40, the meeting participant may also select the data content windows for sharing. That is, the software/firmware running at the computing device 40 may provide the meeting participant with the option (and ability) to select one or more data content windows (e.g., with a cursor, keyboard controls, etc.) for sharing. For example, the meeting participant could highlight the data content windows to be separately shared.

After the content analyzer server 25 receives the data indicating the content windows selected for sharing, at 155 the data content selection module 35 of content analyzer server 25 determines whether the selected data content windows are a result of (i.e., based on) a previous image analysis. That is, the content analyzer server 25 determines whether the selected windows are selections in response to a previous image analysis and associated confirmation request or are un-solicited user selections (i.e., not in response to an image analysis and associated confirmation request). If the selected windows were un-solicited user selections, at 160 separate sharing of the selected data content windows is initiated If the selected windows were in response to a previous image analysis, at 165 the image analysis module 30 of content analyzer server 25 initiates and receives a re-captured image of the display screen 45 of the computing device 40. At 170, the image analysis module 30 determines whether the previously identified data content windows have moved. If the data content windows have not moved, then separate sharing of the selected data content windows is initiated at 160. However, if the data content windows have moved, the image analysis module 30 adjusts which regions of the display screen 45 are to be associated with each of the data content windows and then separate sharing of the selected data content windows is initiated at 160.

FIGS. 3 and 5 generally illustrate examples where two data content windows 70(1) and 70(2) are present at the display 45 of computing device 40 and where both of the data content windows are selected for sharing. It is to be appreciated that different numbers of data content windows may be present at the display 45 of computing device 40 and any number of the data content windows may be selected for sharing. It is also to be appreciated that the selected data content windows can be shared in various combinations (i.e., multiple windows on the same screen, windows on adjacent screens, windows on physically separate screens, etc.).

Figure 6:
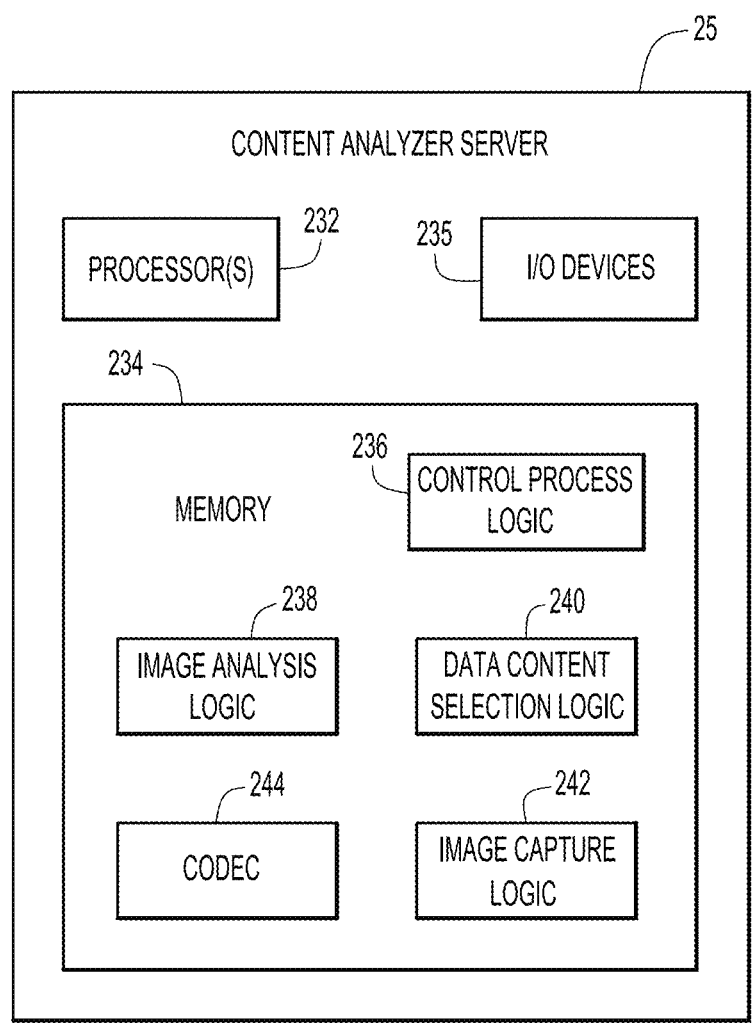
FIG. 6 is a block diagram of a content analyzer server in accordance with examples presented herein.

FIG. 6 is a block diagram of one implementation of content analyzer server 25. The content analyzer server 25 comprises a plurality of processors 232, a memory 234, and optionally various types of input/output (I/O) devices 235. As shown, the memory 234 comprises control processor logic 236, image analysis logic 238, data content selection logic 240, image capture logic 242, and one or more encoding/decoding (codec) applications 242. The memory 234 may comprise read only memory (ROM), random access memory (RAM), magnetic disk storage media devices, optical storage media devices, flash memory devices, electrical, optical, or other physical/tangible memory storage devices.

The I/O devices 235 may comprise, for example, any one or more of a keyboard, a mouse pad, a touch screen, a display, a command-line-interface, etc. to facilitate input and output of data in relation to the content analyzer server 25 (e.g., to facilitate control of the server). The I/O devices 235 can further include any suitable network devices (e.g., one or more of an Ethernet interface card or switch, a modem, a router or any other suitable hardware device) that facilitate a wireless and/or hardwire connection with a network (e.g., local or wide area networks, Internet Protocol (IP) networks such as intranet or internet networks, telephone networks such as public switched telephone networks, wireless or mobile phone or cellular networks, etc.) so as to connect in any suitable manner with teleconferencing endpoints via the network for exchange of video and data content as well as any other types of content associated with teleconference meetings.

The processors 232 can comprise one or more microprocessors that execute the instructions stored in memory 234. For example, the processors 232 may comprise a microprocessor configured to execute the instructions stored in control process logic 236 to, for example, perform operations in relation to control of the teleconferencing endpoints and their associated hardware (e.g., cameras, displays, microphones, etc.) and/or software. This microprocessor (or another microprocessor) can execute the codec applications 44 to facilitate encoding of video images and/or other types of content associated with a teleconference meeting.

In certain examples, the processors 232 can comprise a digital signal processor (DSP) or graphics processor (GPU) that is configured to execute the image capture logic 242 to capture an image of the display 45 of computing device 40. The processors 232 may also comprise an image processor configured to execute the instructions of image analysis logic 238 to analyze a captured image and determined data content windows within the image. One of the above or another processor may execute the instructions of data content selection logic 240 to send a user interface device and/or computing device with indications of determined data content windows and/or receive selections of data content windows for sharing. Thus, in general, the memory 234 may comprise one or more tangible (non-transitory) computer readable storage media (e.g., a memory device) encoded with software comprising computer executable instructions and when the software is executed (by the processors 232) it is operable to perform operations associated with the selective data content sharing techniques described herein.

The above description is intended by way of example only.

What is claimed is:

1. A method comprising:
   receiving, at a content analyzer server of a teleconferencing system, a request from a computing device connected to a local teleconference endpoint to initiate selective data content sharing via a data content steam originating at the computing device, wherein the teleconferencing system is configured to provide video communication via a participant stream that is separate from the data content stream;

identifying a plurality of data content windows displayed at the computing device for the selective data content sharing by analyzing a captured image of the displayed data content windows;

splitting the data content stream into a plurality of separate data content streams, such that each data content window of the plurality of data content windows identified for the selective data content sharing has an associated separate data content stream and different data content windows of the plurality data content windows are shareable at separate displays of the local teleconference endpoint or at separate remote teleconferencing endpoints;

sending first data to one or more of a user interface device or the computing device, wherein the first data includes one or more indications of the plurality of data content windows identified by analyzing the captured image and the indications enable graphical display of the plurality of data content windows to a meeting participant; and receiving second data indicating one or more particular data content windows of the plurality of data content windows as being selected for sharing at one or more of the separate displays of the local teleconference endpoint and the one or more remote teleconferencing endpoints.

2. The method of claim 1, wherein analyzing the captured image comprises:
determining a presence and a configuration of the plurality of data content windows in the captured image.

3. The method of claim 1, wherein the first data further enables generation of a list of the plurality of data content windows identified by analyzing the captured image.

4. The method of claim 1, wherein the second data further indicates which displays of the local teleconference endpoint and the one or more remote teleconferencing endpoints should be used to display the one or more particular data content windows selected for sharing.

5. The method of claim 1, wherein the second data further indicates an arrangement of the one or more particular data content windows selected for sharing at the local teleconference endpoint and the one or more remote teleconferencing endpoints.

6. The method of claim 1, further comprising:
receiving a re-captured image of the displayed data content windows; and
determining whether the one or more particular data content windows are in different positions in the re-captured image as compared to the captured image.

7. The method of claim 1, wherein the first data further enables graphical display of the displays of the local teleconference endpoint and one or more displays of the remote teleconferencing endpoints so that a user can share the different data content windows of the plurality data content windows by moving a graphical representation of the different data content windows to one or more graphical representations of the displays of the local teleconference endpoint and the displays of the remote teleconferencing endpoints.

8. An apparatus comprising:
a network interface unit configured to enable communications over a network; and
one or more processors configured to:
receive a request from a computing device connected to a local teleconference endpoint to initiate selective data content sharing within a teleconferencing system via a data content stream originating at the computing device, wherein the teleconferencing system is configured to provide video communication via a participant stream that is separate from the data content stream;

identify a plurality of data content windows displayed at the computing device for the selective data content sharing by analyzing a captured image of the displayed data content windows;

split the data content stream into a plurality of separate data content streams, such that each data content window of the plurality of data content windows identified for the selective data content sharing has an associated separate data content stream and different data content windows of the plurality data content windows are shareable at separate displays of the local teleconference endpoint or at separate remote teleconferencing endpoints;

send first data to one or more of a user interface device or the computing device, wherein the first data includes one or more indications of the plurality of data content windows identified by analyzing the captured image and the indications enable graphical display of the plurality of data content windows to a meeting participant; and receive second data indicating one or more particular data content windows of the plurality of data content windows as being selected for sharing at one or more of the separate displays of the local teleconference endpoint and the one or more remote teleconferencing endpoints.

9. The apparatus of claim 8, wherein to analyze the captured image, the one or more processors are configured to:
determine a presence and a configuration of the plurality of data content windows in the captured image.

10. The apparatus of claim 8, wherein the first data further enables generation of a list of the plurality of data content windows identified by analyzing the captured image.

11. The apparatus of claim 8, wherein the second data further indicates which displays of the local teleconference endpoint and the one or more remote teleconferencing endpoints should be used to display the one or more particular data content windows selected for sharing.

12. The apparatus of claim 8, wherein the second data further indicates an arrangement of the data content windows selected for sharing at the local teleconference endpoint and at the one or more remote teleconferencing endpoints.

13. The apparatus of claim 8, wherein the first data further enables graphical display of the displays of the local teleconference endpoint and one or more displays of the remote teleconferencing endpoints so that a user can share the different data content windows of the plurality data content windows by moving a graphical representation of the different data content windows to one or more graphical representations of the displays of the local teleconference endpoint and the displays of the remote teleconferencing endpoints.

14. The apparatus of claim 8, wherein the one or more processors are further configured to:
receive a re-captured image of the displayed data content windows; and
determining whether the one or more particular data content windows are in different positions in the re-captured image as compared to the captured image.

15. One or more non-transitory computer readable storage media encoded with software comprising computer executable instructions and when the software is executed operable to:
- receive a request from a computing device connected to a local teleconference endpoint to initiate selective data content sharing within a teleconferencing system via a data content stream originating at the computing device, wherein the teleconferencing system is configured to provide video communication via a participant stream that is separate from the data content stream;
- identify a plurality of data content windows displayed at the computing device for the selective data content sharing by analyzing a captured image of the displayed data content windows;
- split the data content stream into a plurality of separate data content streams, such that each data content window of the plurality of data content windows identified for the selective data content sharing has an associated separate data content stream and different data content windows of the plurality data content windows are shareable at separate displays of the local teleconference endpoint or at separate remote teleconferencing endpoints;
- send first data to one or more of a user interface device or the computing device, wherein the first data includes one or more indications of the plurality of data content windows identified by analyzing the captured image and the indications enable graphical display of the plurality of data content windows to a meeting participant; and
- receive second data indicating one or more particular data content windows of the plurality of data content windows as being selected for sharing at one or more of the separate displays of the local teleconference endpoint and the one or more remote teleconferencing endpoints.

16. The non-transitory computer readable storage media of claim 15, wherein the instructions operable to analyze the captured image, further comprise instructions operable to:
- determine a presence and a configuration of the plurality of data content windows in the captured image.

17. The non-transitory computer readable storage media of claim 15, wherein the first data further enables generation of a list of the plurality of data content windows identified by analyzing the captured image.

18. The non-transitory computer readable storage media of claim 15, wherein the second data further indicates which displays of the local teleconference endpoint and the one or more remote teleconferencing endpoints should be used to display the one or more particular data content windows selected for sharing.

19. The non-transitory computer readable storage media of claim 15, wherein the second data further indicates an arrangement of the data content windows selected for sharing at the local teleconference endpoint and at the one or more remote teleconferencing endpoints.

20. The non-transitory computer readable storage media of claim 15, wherein the first data further enables graphical display of the displays of the local teleconference endpoint and one or more displays of the remote teleconferencing endpoints so that a user can share the different data content windows of the plurality data content windows by moving a graphical representation of the different data content windows to one or more graphical representations of the displays of the local teleconference endpoint and the displays of the remote teleconferencing endpoints.

* * * * *